3,000,125
PICTORIAL DISPLAY DEVICE
Victor Elvestrom, Minneapolis, Minn., assignor to Cinestat Corporation, Chicago, Ill., a corporation of Delaware
Filed Feb. 24, 1959, Ser. No. 795,104
17 Claims. (Cl. 40—137)

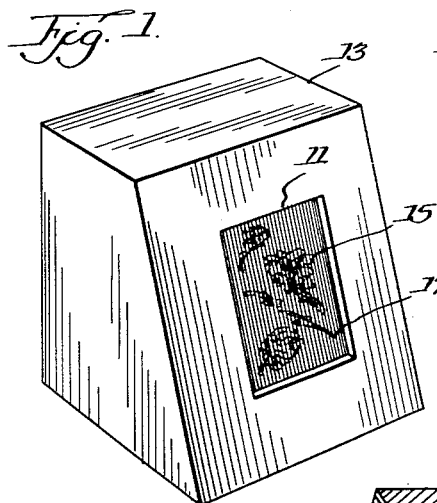
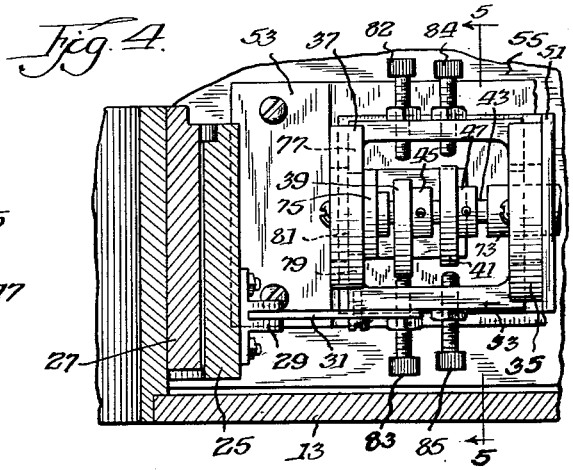
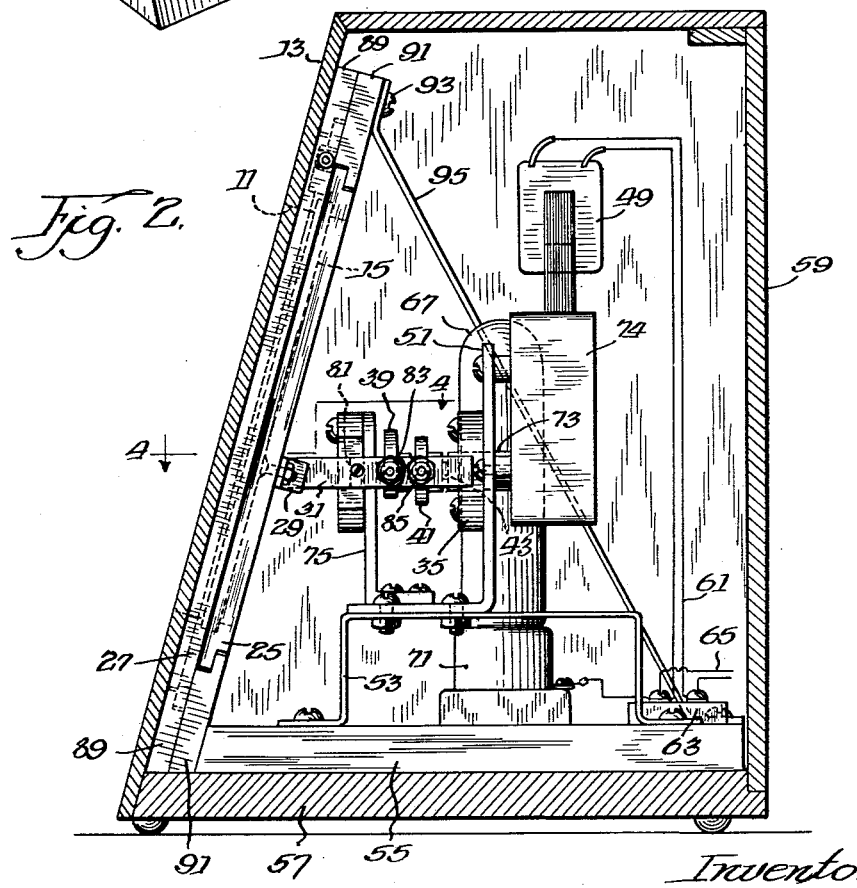

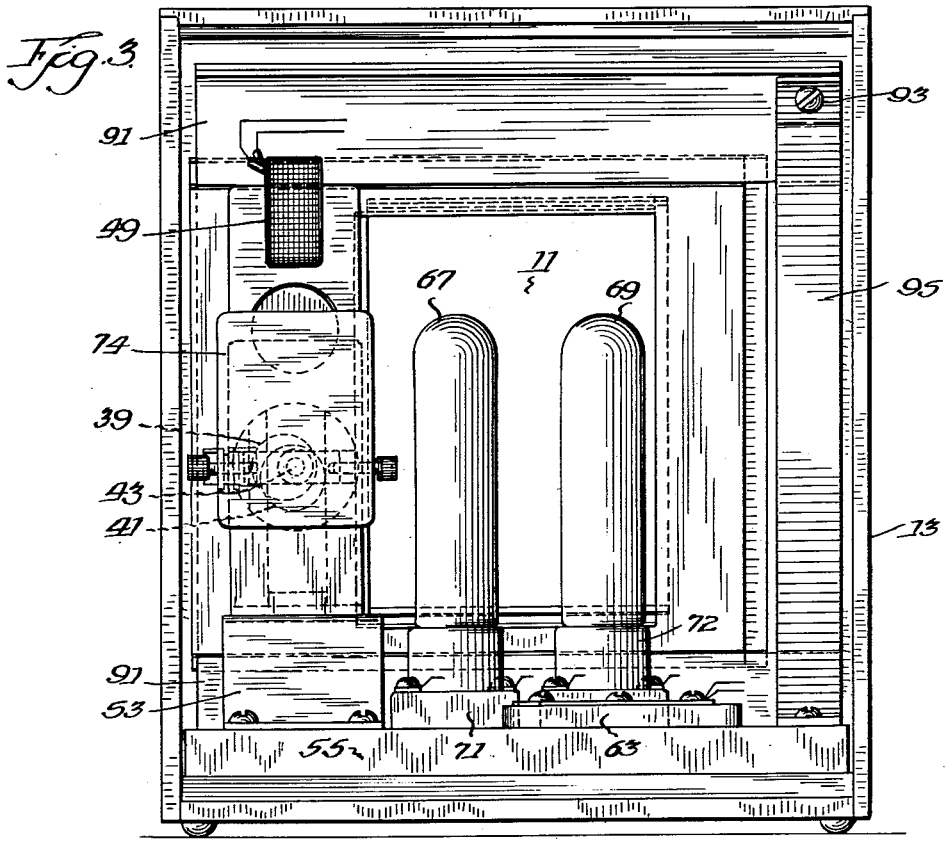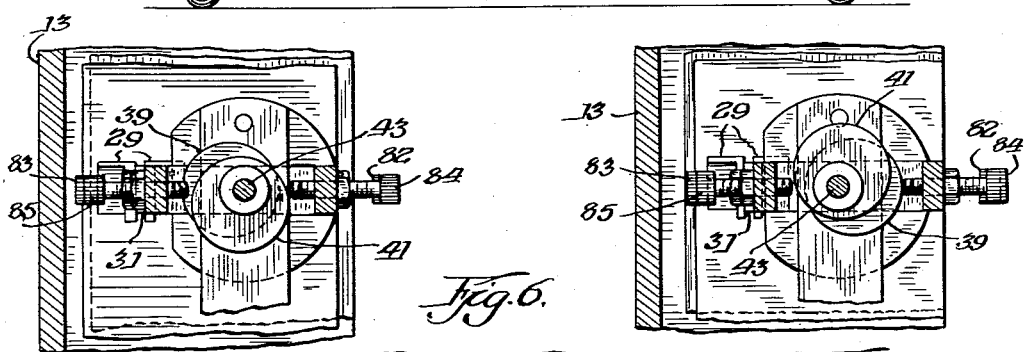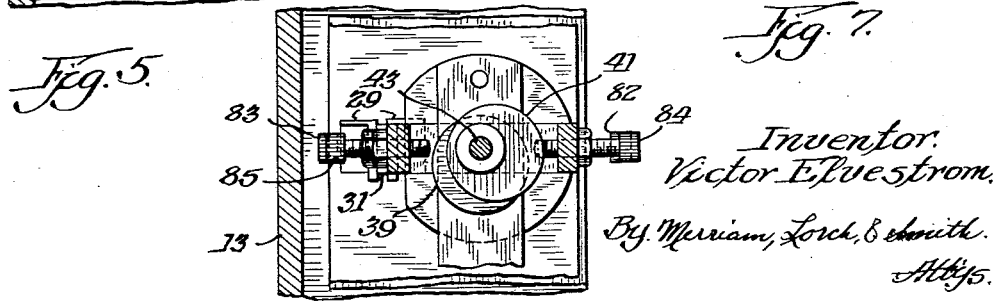

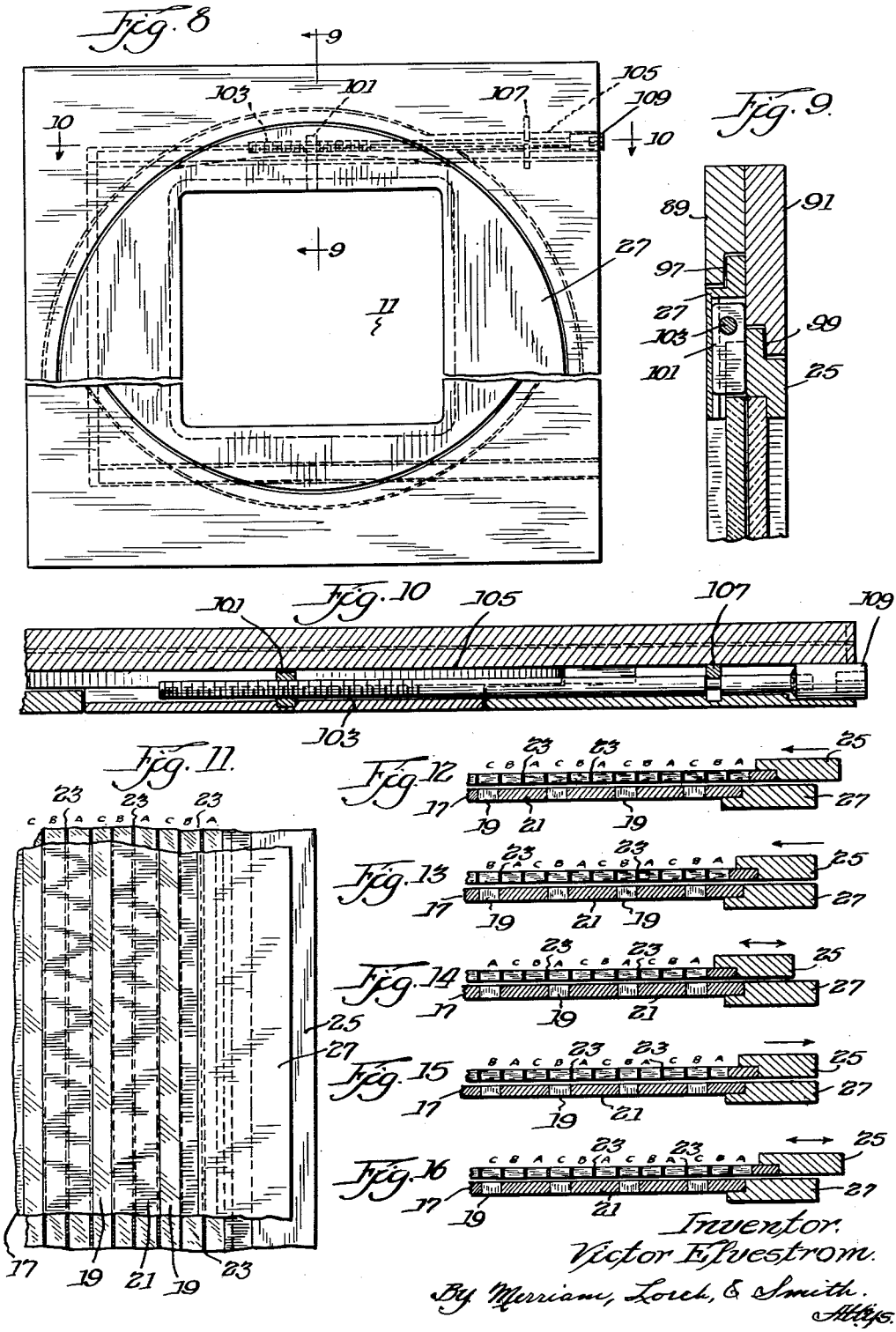

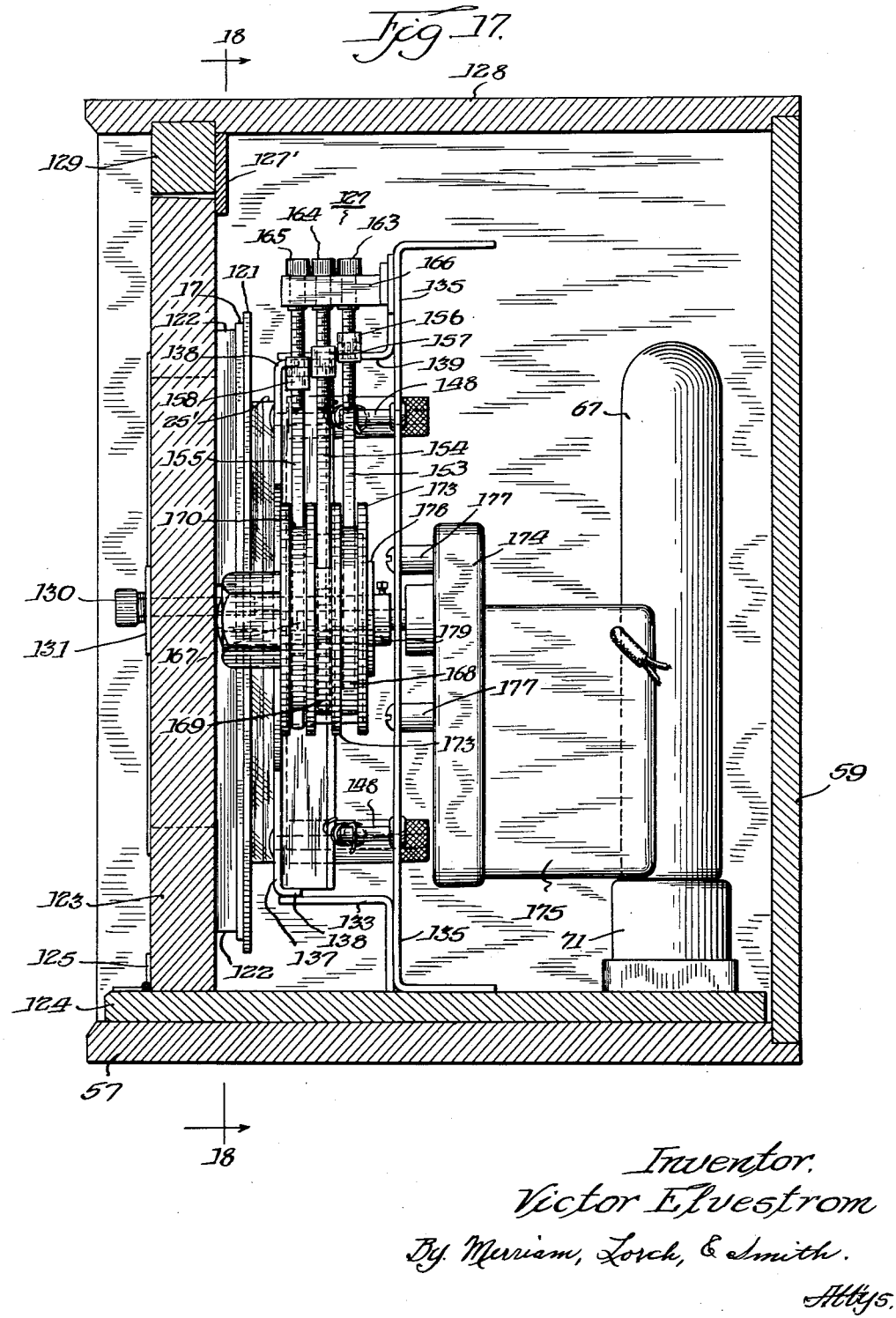

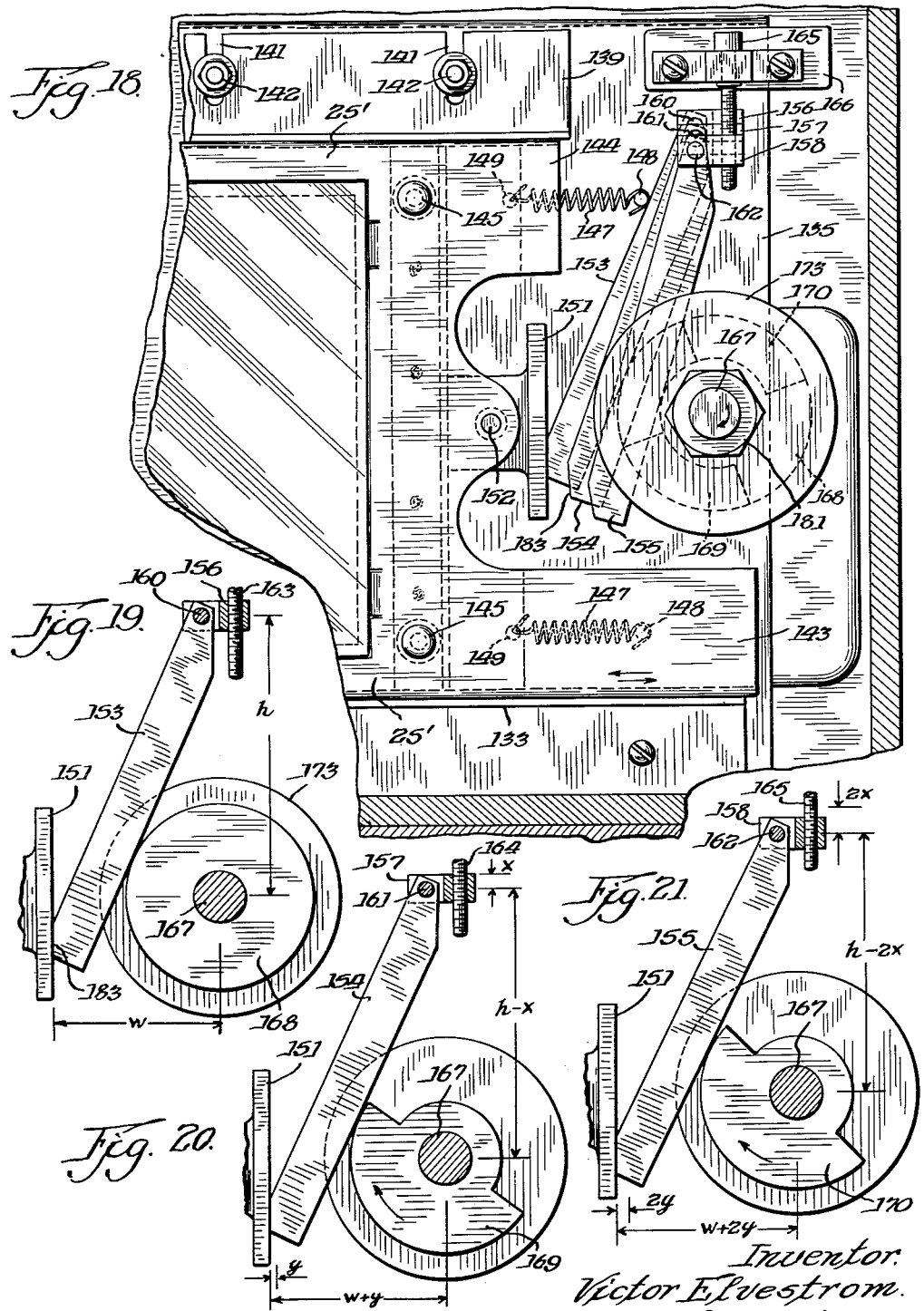

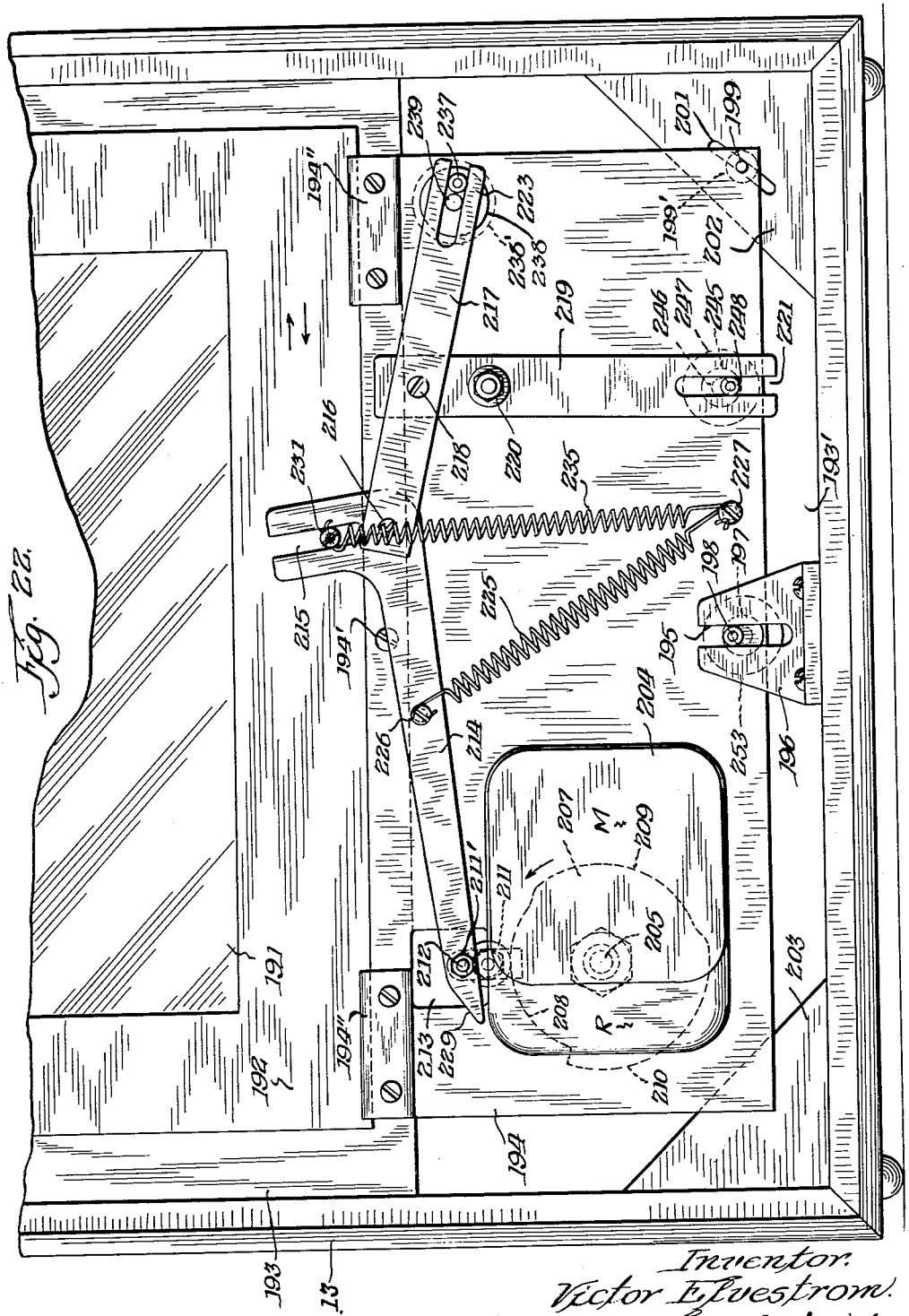

This invention relates to display apparatus suitable for exhibiting in sequence and in selected order a plurality of separate and distinct pictorial representations for viewing by observers at remote points.

In its most particular aspects the present invention relates to a driving and controlling mechanism whereby both the position of the different pictures with respect to the exhibiting area and the time period of exhibition may be selectively changed.

Exhibiting apparatus of the general character to which this invention relates has been disclosed by copending United States patent application, Serial No. 681,252, now abandoned, filed August 30, 1957, and entitled "Display Device." The form of apparatus with which this invention is particularly concerned is in improvements over the prior state of the art which have been brought about by arranging a multiplicity of pictorial representations in broken-apart form in such a way that each individual representation is composed of a multiplicity of segregated, similarly positioned, like-size incremental areas to be brought selectively within a field of view or projection. The different incremental areas of each separate representation are spaced from each other by intervening incremental areas of other representations prior to viewing or projection but when so exhibited the incremental areas of like representations appear to merge into a single image. This comes about by locating a border region adjacent to each incremental area, the border region having a uniform light transmitting characteristic which is different from that of the pictorial representation to be exhibited. Each border area isolates each incremental area from the nearest adjacent incremental area of one of the other representations. Usually the most satisfactory isolation results when the border area is light-absorbing and completely opaque. However, while an opaque border area does not transmit light and is substantially non-reflecting if black, it is nonetheless, possible also to use border areas of a high and generally constant light transmitting characteristic, such as transparency, although a lower transmission as is obtainable with a gray border, for instance, is also useable, since the constant character of any light transmission through such border area (whether transparent or semi-transparent) merely has the effect on the observers of tending to raise the overall brilliance of the viewed representation.

The copending application to which reference has already been made provides a viewing panel, arranged with any desired number of separate pictorial representations for display purposes. The representations are selectively exhibited by projecting the image thereof through a suitable masking element having openings positioned similarly to the positions of all of the incremental areas serving to represent collectively one pictorial representation. The individual incremental areas from which the representations are formed may be of various shapes and configurations, such as strips, undulating bands, dots, herringbone, or other appropriate form. Likewise, the apertures in the masking element are of similar form and of a size, such that when each individual incremental area of each pictorial representation is projected or reflected therethrough, and each incremental area is centered in the mask aperture, no incremental area of other pictorial representations can be viewed.

The masking areas of constant light (that is, in the range between zero for opaque to a maximum for a transparency) transmission characteristics adjacent to each incremental area of each pictorial representation permit minor lacks of centering of the various incremental areas within the mask apertures.

Change from one to another of the pictorial representations for specific purposes is brought about by shifting, according to any desired schedule, the relative position of the mask apertures and the pictorial representations and will be dealt with particularly in this application.

As the invention will be described in this application, it may be assumed for illustrative purposes that the incremental areas into which the pictorial representations are formed are each of strip-like characteristic and arranged to extend substantially parallel to one edge of a parallelogram-shaped viewing area. With the pictorial representation so formed, if it be used for exhibiting three separate and distinct pictorial representations, for instance, each incremental strip area has positioned adjacent to it on each long-dimensional side a similar strip area of a different pictorial representation and each adjacently positioned strip or incremental area is spaced slightly from that strip nearest to it by the uniform-intensity masking strip area. Any one pictorial representation, when viewed, appears to the viewer's eye as if formed in normal fashion, so that there are no visible or apparent separations between the individual areas, although at the plane where the different incremental areas first manifest themselves in the viewing mask, they are actually spaced one from the other.

Assuming the pictorial representations each to be formed of a multiplicity of spaced incremental strips parallel to which the apertures of a masking element are positioned, this invention is concerned with apparatus and means for moving the masking and pictorial areas relative to each other to provide for exhibiting like incremental areas of selected representations through the mask apertures. This relative movement between the mask and the pictorial representations is accomplished according to the present invention by mechanism which effects relative movement in a direction perpendicular to the long dimension of each incremental strip while retaining each of the masking area and the plane on which the pictorial representations are developed in like spaced relationship. In one of its forms the apparatus comprises means for reciprocating one of the mask or the pictorial representations while retaining the other stationary and provides either for intermittently moving the two elements back and forth with respect to each other, or moving one element slowly with respect to the other and then abruptly returning the mechanism to a starting position to repeat the motion. In this motion the so-called "dwell" time of the incremental areas of the separate pictorial representations within the mask area may all be identical or can be different, depending upon the need and operational set-up.

The apparatus as here disclosed is particularly useful in the display and advertising fields wherein various images may be exhibited in any desired and chosen sequence and the advertising may be of single articles shown in various stages, it may be to display more than a single product of a single manufacturer, or it may be obviously to display a plurality of unrelated representations.

Within the general scope of what is here disclosed various modifications may be made but generally within the objects of the invention are those of providing a clearly simplified structure for effecting the display of a multiplicity of pictures individually and one at a time at a desired sequence and rate with substantial freedom from interference one from the other during the process.

Other objects of the invention are those of providing a controlled movement of a display panel including a multiplicity of pictorial representations relative to each other in a way such that the time dwell of the different areas within the viewing region may be appropriately controlled.

Other objects of the invention are those of providing a mechanism whereby alignment between the viewing apertures of the masking element and the multiplicity of incremental strips may readily be achieved.

Further objects of the invention are to provide a display device adapted to reveal, in sequence, a selected number of individual pictorial representations in a substantially foolproof operation by a relatively inexpensive and troublefree drive mechanism and by a mechanism easily adapted to changing between different selected pictorial representations.

Other objects of the invention will, of course, suggest themselves by reading the following description and claims in connection with the accompanying drawings wherein in schematic form;

FIG. 1 represents on a greatly reduced size scale an exhibiting device including suitable housing, cabinet or covering for enclosing the drive mechanism and the displays together with a viewing window area through which the selected pictorial representations may be displayed to view;

FIG. 2 is a section view taken longitudinally through the display device of FIG. 1 in the region between the right edge of the viewing window and the right inner wall of the cabinet housing and looking in the direction of the viewing window;

FIG. 3 is an elevation view, looking into the cabinet of FIG. 1 from the rear, with the rear enclosure panel removed;

FIG. 4 is a view partly in section and partly in plan, taken on the line 4—4 of FIG. 2, looking in the direction of the arrows, to show the drive and positioning mechanism for locating the relative positions of the pictorial representations and the mask;

FIGS. 5, 6, and 7 are sectional views through the drive mechanism, taken on the line 5—5 of FIG. 4, looking in the direction of the arrow, with FIG. 5 representing a relative movement of the mask and pictorial representation to a maximum extent to one direction, say the left, FIG. 6 representing a mid position, and FIG. 7 representing an extreme position and movement to the right.

FIG. 8 is a view from within the display cabinet to show the aligning mechanism for obtaining alignment between the mask apertures and the incremental areas of the pictorial representations;

FIG. 9 is a sectional view, greatly enlarged, taken on the line 9—9 of FIG. 8, looking in the direction of the arrows, to show the relative adjustment; and FIG. 10 is also a sectional view, taken on the line 10—10 of FIG. 8;

FIG. 11 is a view, greatly enlarged, to show the relative positioning and aligning of the mask and apertures and pictorial representations of a series of three images, each having incremental strips forming the pictorial areas, all located parallel to each other and shown as spaced from each other by masking areas;

FIGS. 12 through 16, inclusive, represent relative positionings of the mask and its apertures and pictorial representations with respect to each other to view a series of three images in sequence and showing five successive steps in that viewing operation but not indicating the rate of transition between the steps;

FIG. 17 is a sectional view, taken on a plane generally corresponding to that of FIG. 2 and arranged to show a modification of a form of drive mechanism for establishing relative movement of the mask and pictorial representations with respect to each other;

FIG. 18 is an elevation view of the drive mechanism of FIG. 17, looking toward the viewing window of FIG. 1, with the outer cover of the display cabinet removed;

FIGS. 19, 20, and 21 are figures arranged to show, in sequence, a series of three different positional adjustments between the masking area and the strips or incremental areas forming the plurality of pictorial representations; and FIG. 22 is a still further modification of a drive mechanism for maintaining relative movement between the pictorial representation of the mask and shown in elevation, looking into the cabinet of FIG. 1, with the rear panel removed to picture operation of the adjusting and positioning mechanism.

Referring now to the drawings for a further understanding of the invention, the pictorial representations for exhibiting are caused to appear within the window area designated at 11, formed in one wall of a display cabinet 13. As will be evident from the remaining figures of the drawing in the application and the description, the cabinet 13 is adapted to house all of the illumination means by which the pictorial representations are caused to become visible, the drive mechanism, the representations, the mask areas, and the like. The cabinet is one form of display but it will be recognized that the representations could also be exhibited from a bill-board or panel structure with which control apparatus of the type here displayed is associated.

To illustrate the operation, one pictorial representation is conventionally shown in more or less phantom style by FIG. 1 by the outline 15. Solely for designation purposes, the masking element is conventionally represented by the lined regional designations 17, although in viewing the display from an optimum or greater viewing distance this could not be seen. As will be noted from the showing of FIGS. 12 through 16 in particular, the masking element 17 comprises an alternate series of apertures and opacities which are provided by the openings or transparent strips 19 and opaque areas 21. The opaque regions fully mask the strips of pictorial representations not instantly before the apertures. The pictorial representations, here assumed for purposes of simplicity of description to comprise three separate pictorial images, are each broken apart into a number of incremental strip areas, the strips of each of which representations are designated for convenience by letters, such as the letters A, B, and C. In reconstituting the images and in viewing the same at a reasonable observation distance from the viewing window 11 (usually a point at a distance where adjacent apertures can be considered as being no farther apart than one minute of arc at a radius represented by the distance from the observer to the plane of the displayed representation) in the viewing cabinet it appears to observers as though all areas instantaneously exposed are actually contiguous, although, as can be seen from the showings particularly of FIGS. 12 through 16, pictorial representations of the different images are actually physically separated. The separation of the representations in the illustrated example is by two other images and border regions of like light transmitting characteristics, such as those represented in the drawing by the opaque strips 23. The transverse width of each aperture, slot, or incremental strip opening 19 in the mask element 17 corresponds accordingly to the projected widths and lengths of each of the incremental strip areas A, B, or C. The separation between adjacent mask openings corresponds to the projected widths of the two masked pictorial incremental areas and the width of the three like light transmission characteristic border areas, such as those shown by the opaque strips 23. The so-called apertures 19 may be actual openings or the areas may be transparencies, such as glass, according to desire. This has been explained also in the copending application hereinbefore mentioned for purposes of referring initially to the manner of exposing the pictorial representations and considering the showing of FIGS. 11 through 16.

As an initial illustration, the pictorial representations viewed in the window area 11 of the cabinet 13 correspond to those representations which are instantaneously revealed by the apertures 19 in the masking element 17. As shown by FIG. 11, the mask apertures or transparencies 19 reveal the incremental strips designated as C so that, in viewing the representation, looking at FIG. 11, the right hand edge of each incremental strip C is assumed to be separated from the left-hand edge of the next adjoining incremental strip of the same image by two intervening strips B and A, as well as three border regions of constant light transmission characteristics, designated here by the opaque regions 23.

Relative movement between the mask proper and the pictorial representations provides for exposing and presenting different pictorial representations to view. The plan is schematically represented by the diagrammatic showings in FIGS. 12 through 16. In these figures, initially considering FIG. 12, it will be apparent that each incremental strip area C is visible through one of the openings or apertures 19 of the masking area 17. In the form in which the invention has been diagrammatically viewed it will be observed from the arrow designation that the pictorial representation as a whole is assumed to be supported in a frame 25, the right-hand border of which is shown. The mask 17 is assumed to be held in a stationary frame, designated at 27. In one form of the operation relative movement between the pictorial representation of the mask is obtained by moving the frame support 25 holding the pictorial representation so that in the second assumed designation, as represented in FIG. 13, the mask apertures 19 reveal only incremental strip area B and the opaque portions of the mask 21 mask pictorial incremental strip representations A and C from view. In this position only pictorial representation B becomes visible to an observer who locates the mask element 17 between himself and the pictorial representation. Continuing the exposure of the different pictorial representations by establishing relative movement between the mask and the pictorial representation those incremental strips designated as A next come into view when the motion of the frame 25 is continued in the same direction, as shown by FIGS. 12 and 13.

In this last-named position the incremental strip areas B and C are masked by the opaque portions 21 of the mask 17. The portion shown by FIG. 14 represents one extreme and to reexpose the pictorial representations, the frame 25 is then carried back in the direction of the arrow shown by FIG. 15 to a position where the incremental strip areas B are exposed, this being a position similar to that shown by FIG. 13. Continuing the reciprocating movement of the frame 25 and the pictorial representations carried thereby relative to the mask 17 held in the frame 25, the picture C next becomes visible through the mask apertures. This position corresponds to that shown by FIG. 12, after which the procedure is repeated. For the conditions illustrated by FIGS. 12 through 16 pictorial representations A—B—C—B—A and so on are successively exposed.

Referring now to FIGS. 2 through 7 in particular the pictorial representation 15 held within the frame 25 is secured by a bracket 29 to a drive arm 31, carried by a yoke member 33, which is adapted to move within the guides 35 and 37 with the motion being controlled by the instantaneous position of a pair of cam elements 39 and 41 secured to a drive shaft 43 by suitable collars and set screws 45 and 47. The drive shaft 43 is turned under the control of a suitable motor, here conventionally represented at 74, held from a bracket 51, secured to a second U-shaped positioning bracket 53, carried upon a sub-base 55, adapted to be positioned within the cabinet 13 and rested against the base member 57 thereof. The sub-base and the components supported thereby are positioned within the cabinet 13 by removing or opening the rear panel 59.

In the assumed operation the motor 74 may be an electric motor to which energy is supplied through the transformer 49 and lead conductors 61, plugged into a base socket 63 to which power is supplied by lead-ins 65. The base socket will also provide a connection for power for energizing the plurality of light sources 67 and 69 which are secured in appropriate bases or sockets 71 and 72, secured to the sub-base 55. As the illuminating sources are shown, they have been conventionaly indicate as incandescent lamps but it will be appreciated that any appropriate form of light source, such as fluorescent tubes, and the like, may be utilized. Diffusion of the light issuing from the sources 67 and 69 through the pictorial representation and the apertures 19 of the masking element 17 may be provided by the lights themselves or by diffused reflectors (not shown), contained within the cabinet or in any other desired fashion.

Relative movement between the pictorial image carried within the frame 25 and the masking element 17 held within the support frame 27 is provided when the motor shaft is rotated and carries with it the rotating cams 39 and 41. In most instances there is an appropriate reducing gear box (not shown) contained within the motor housing conventionally represented at 74, to connect the motor armature or rotor with the drive shaft 43, whereby the speed at which the shaft rotates is appropriately controlled. The shaft 43 extends through the conventionally represented bearing 73 in the guide 35 and thence terminates in a second bearing in support-bracket 75. Each of the guide 35 and support-bracket 75 is carried from the U-shaped bracket 53, held to the sub-base.

Adjacent to the shaft and support for slidable movement in a plane preferably parallel to that of the sub-base is a generally U-shaped yoke member 33, already designated. The forward end of the yoke member 33 has inwardly projecting ends 77 and 79 which are held within a groove or slot in a support 81, which is secured to the support-bracket 75. Positioned on either side of the generally U-shaped bracket 53 are four position adjusting screws 82, 83, 84, and 85 which project completely through the wall of the bracket to a position whereat the screws 82 and 83 are adapted to contact the periphery of the cam 39 in two positions of its rotation and the screws 84 and 85 are similarly adapted to contact the periphery of the cam 41 in other positions of the rotation. The set screws are appropriately locked to the yoke 33 so that with rotation of the cams the cam surface is adapted to press against the inwardly extending end of the screws to move the yoke laterally through the guide slots either to right or left (see, for instance, FIGS. 4 through 7).

The drive arm 31 is secured to the yoke 33 and, consequently, with back and forth, or right and left movement of the yoke this drive arm will move the frame 25, holding the pictorial representation either to the right or to the left. The position in which the cams 39 and 41 are indicated with respect to the screws 82 through 85 in FIG. 4 corresponds essentially to that shown by FIG. 5 and represents a position of adjustment by the pictorial frame carrying member 25 completely to the left (looking into the cabinet 13 from the rear). In this position, following the designations shown by FIGS. 12 through 16 particularly, it can be appreciated that each of the incremental strips of the pictorial representation C is moved behind one of the apertures 19 in the masking element 17, it being appreciated that with the cam 39 in the position indicated by each of FIGS. 4 and 5, the screw 83 will be forced as far away from the center of the shaft 43 as is possible. With rotation of the motor drive shaft 43 (illustratively assumed to be counterclockwise) and with the cams 39 and 41 held to the shaft in the relative positions generally indicated by FIGS. 5, 6, and 7, it will be seen, as per FIG. 6, that the cam 41 is next brought to a contact position with the end of the screw 84 as the follower element and rotation of the cam tends to move the screw 84, and with it yoke 33, in a direction as indicated by the diagrammatic showing of FIG. 13 to position incremental areas of the pictorial representation B behind the apertures 19 of the mask element. Further rotation of the shaft 43, and with it the cams, brings the cam 39 into contact with the outer end of the screw 82. This again moves the yoke and, consequently, the frame 25 in the same direction (indicated by FIG. 14) and brings each incremental strip of the pictorial representation A behind one of the apertures 19 of the masking area. As the cams still continue to rotate the cam 41 next rotates to a position where its periphery is sufficiently eccentric to the center line of the shaft 43 to bring it into contact with the end of the screw 84, whereupon return movement of the yoke and, consequently, the frame 25 to the initial, or starting position is commenced. This brings the incremental strips of the pictorial representation B again within the field of the apertures 19 of the masking area 17. As the cams continue to rotate, along with the drive shaft 43, the cam element 39 again comes into contact with the outer end of the screw 83 and, as shown by FIG. 16, the relative positioning of the frames 25 and 27, and, therefore, the pictorial representations and the mask 17 correspond to those depicted in FIG. 12 and the incremental areas C are again aligned with the apertures 19 of the mask.

Where precise parallelism between the long dimension of the apertures 19 of the mask and the incremental areas A, B, or C of the plurality of pictorial representations is not had the masking element may be slightly rotated relative to its supporting frame 25, as shown by each of FIGS. 8 through 10, in particular. The masking element 17 which is held within the frame 27 so as to be supported to extend completely over the viewing window 11 in the cabinet 13 is adapted to be held in close relationship relative to the pictorial image carrying frame 25 by means of a pair of bracket members 89 and 91 which are secured together by means of a suitable fastening element 93 (see FIG. 2) at their top and supported from the sub-base by any appropriate form of bracket member 95. At the bottom the members 89 and 91 are similarly secured together and held adjacent to the sub-base 55. The mask support frame 27 at its upper and lower edges terminates in a generally L-shaped bracket 97 which fits within a complementary shaped form of the member 89. Similarly, the support frame 25 for the pictorial representation is formed generally similarly, as indicated at 99, and is held within the member 91 in similar fashion.

The fastening of the members 89 and 91 together thus provides a clamp whereby relative positions of the mask and pictorial representation can be achieved. However, where it becomes necessary to bring the mask apertures 19 into parallelism with the elongated longitudinal elemental or incremental areas or strips A, B, and C of the pictorial representation this adjustment is achieved by positioning an adjusting nut 101 within the recesses within the frame 27. An adjusting screw 103 which is located in the opening 105 extending outwardly through the frame member threads into the adjusting nut 101. The adjusting member or screw 103 is held in position against longitudinal movement by a spacer 107 secured thereto so that with the turning of the outer end 109 of the screw it becomes apparent that the nut 101 must move in or out along the length of the screw and thereby cause a rotation of the frame member 27 relative to the bracket support 89. Such minor relative rotation between the two members accordingly turns the masking element 17 about an axis, generally centered at the center of the viewing window 11 behind which the pictorial representation is positioned. This movement (or rotation) adjusts the mask strips relative to the pictorial image strips and, consequently, aligns the elongated mask apertures 19 with one of the incremental areas A—B or C of the pictorial representation. When parallelism is obtained between the long dimension of the apertures 19 and the masking strips lateral adjustment in the direction perpendicular to the long dimension of the incremental areas A—B or C is achieved by rotation of the drive shaft 43, and with it the cams 39 and 41, at which time the final relative set position between the various screws 82 through 85 and the angular positioning of the cams 39 and 41 on the shaft 43 are established. Illustratively, if the alignment is established between the pictorial representation and the various mask apertures 19, the cams and screws can be set to the relative positions indicated by FIGS. 4 through 7, inclusive, it being understood that the setting for FIG. 5, illustratively, brings the areas C within the mask apertures 19 and the setting of FIG. 7 brings the incremental areas A within these apertures. The mid-position is indicated by FIG. 5 and the cam positions with the screw positions there shown. Only a moderate amount of experimentation is required to achieve this desired setting.

With the screws 82, 83, 84 and 85, acting as cam followers, setting the actual time, any one pictorial representation A, B, or C, aligned with apertures 19, is subject to a moderate degree of choice which is had by a control of the relative angular positioning of cam 39 and 41 on the shaft 43 to which they are locked, as by set-screws.

Reference may now be made to the modification of the invention which is depicted particularly by FIGS. 17 through 21, inclusive, which show a form of control mechanism by which the display of say three distinct pictorial representations A—B and C may be caused to appear within the apertures 19 of the mask 17 in sequential order, that is, the pictures appear A—B—C—A—B—C and so on. This sequence is achieved through the use of a quick return mechanism for shifting the relative position of various pictorial representations with respect to the apertures of the mask element.

In these figures last named, and particularly in FIG. 17, the masking element is of the general type set forth particularly by FIGS. 1, 2 and the group 12 through 16, but is shown for convenience only schematically in FIG. 17 by the element 17 held within a diagrammatically shown frame comprising elements 121 and 122 which are held upon a mounting bracket or support 132 which is carried upon a sub-base 124 to fit within the cabinet of the type shown at 13 in FIG. 1. The sub-base 124 is positioned within the cabinet structure to rest upon the cabinet base 57 to which it may be attached in any desired fashion, such as by screws (not shown). It may be held from the rear by the backing member 59.

In most instances it is preferable to locate the support or mounting bracket 123 relative to the sub-base by means of a hinge, such as 125, in order that the assembly may be hingedly moved away from the picture moving mechanism, collectively represented at 127, whereby the cabinet is opened from the front. The mounting bracket 123 is then caused to come to rest against a stop 127', secured to the cabinet lid 128, and when in position substantially abuts a cross-member 129 extending transversely of the cabinet wall. The frame elements 121 and 122 are held within the support 123 at opposite ends of the elongated viewing window, such as that shown in FIG. 1, by means of fastening screws 130, which rest adjacent to a bracket plate 131, secured to the support members 121 and 122. When the support 123 is in the position indicated in FIG. 17 it can be observed that the support members 121 and 122 which hold the mask 17 are carried substantially adjacent to a frame 25' which holds the pictorial representation.

Referring particularly to FIGS. 17 and 18, the frame 25' is held for slideable movement back and forth in the direction shown by the arrows (see FIG. 18) and is caused to rest upon an angle bracket 133 which is secured to a mounting plate 135 held upon the sub-base 124 in any desired fashion. Preferably, the support frame 25' is secured to a backing plate 137 which has inwardly turned edges 138 at both its top and bottom and which has centrally thereof a viewing window or opening at least as large as the pictorial representation which is to be portrayed. The upper inturned edge is then held to bear against the lower edge of an upper bracket 139, also secured to the mounting plate 135. As can be seen particularly from FIG. 18 the upper bracket 139 is provided with slots 141 through which suitable fastening bolts 142 are passed and by means of which the bracket can be adjusted up and down in accordance with the width of the frame member 25'. When the elements are so assembled the frame member 25' is securely held and cannot move back and forth.

This frame member and the backing plate 137 are elongated at the ends 143 to provide a foot which rests against the bracket 133 and at its upper edge also by an extension 144 which bears against the lower surface of the bracket 139. With the frame assembly 25 held to the slideable members by means of fastening screws, conventionally represented at 145, the assembly is held tightly against the mounting plate 135 by means of springs 147 which attach at one end to the pins 148 carried by the mounting plate and at the other end to a pin 149 on the support frame. The frame at its central region terminates in a plate 151 which is tightly secured by a support pin 152. The assembly, looking at FIGS. 18 through 21, tends to be pulled to the right from the position shown by means of the tension springs 147. In this position the plate 151 is caused to press against one of a plurality of arms 153, 154, and 155 which are hung from a series of support brackets 156, 157, and 158 and through each of which a pin 160, 161, and 162 projects. Each of the arms is loosely pivoted in the position shown with the height of the pivot points 160, 161, and 162 being determined by adjustment of the respective screws 163, 164, and 165, respectively, which extend through the supporting bracket 166 and threading into the members 156, 157, and 158, respectively, so that (see particularly FIGS. 19 through 21) the vertical distance between the pivot points for the respective arms and the support shaft 167, having a plurality of cams 168, 169, and 170, may be adjusted. The cams 168, 169 and 170 are all secured to the shaft 167 and each is separated from the other by a disk 173. Separation between any two adjacent disks 173 is just slightly greater than the width of any of the swingable pivoted arms 153, 154, and 155 to permit the pivoted and swingable arms to rest upon the cams 168, 169, and 170 loosely and yet to be guided to follow the contour of the cam surface in such a way as to constitute a cam follower.

The support shaft 167 is rotated at an appropriately chosen speed by the motor 175 through any suitable gearing (also not shown), if desired, contained within the motor housing 174. The motor and its associated gearing box are carried from the mounting plate 135 by the mounting pins 177 or any other suitable means. The assembly of the plurality of cams 168, 169, and 170, separated by the disks 173, is held upon the shaft 167 tightly against the ring 178 and the collar 179 which is fastened to the shaft by means of the indicated set screws. The outer end of the assembly is tightly held by the fastening nut 181.

The outer edge of each of the arms 153, 154, and 155 is flattened, as shown at 183, so as to bear against the outer surface of the plate 151, as well as the periphery of the appropriate cam. Adjusting the relative heights of the pins or pivot pins 160, 161, and 162 and maintaining the length of the arms 153, 154, and 155 equal makes the distance along each arm between its contact edge 183 and the plate 151, and a line passing through the center of the shaft 167 and the point of tangency of the arms to the cam surfaces differ. With the radius of the cams 167 being constant and the arm 153 being at a point 160 which is more remote from the center of shaft 167 than points 161 and 162 the angle which arm 153 makes with respect to the outer cam surface is less than that of the other arms so that the distance is greater between the pivot point and the point of tangency to the cam surface than that of the other arms. The height of the arm constitutes one side of a triangle which may be considered as represented by the letter $h$ for a maximum distance. For this condition the distance between the center of the shaft 167 and the point at which the flattened edge 183 of the arm 153 contacts the plate 151 may then be considered as represented by the distance $w$, with the arm resting against the cam or disk 168. The adjacent arm 154 may then be considered as hung from a pivot point 161 which is lower than for the arm 153. The arm 154 is then adapted to turn about the pin or pivot point 161 which is shown as per FIG. 20 as raised above the center of the shaft 167 by a distance of only $h-x$, where $x$ represents the difference in height of the pivot points 160 and 161. With the maximum eccentricity of the cam surface 169 being such that it has a radius which is equal to that of the disk or cam 168, the distance from a point on the outer edge of the arm 154 directly opposite the point of tangency to the cam surface 169 is greater than the length between related points on the arm 153 to the plate 151. This is schematically illustrated in FIG. 20 by the distance $y$ so that, with the arm 154 resting upon the outer edge of the cam 169, the plate 151 is moved to the left from the center of the shaft 167 by a distance $(w+y)$. Similarly, with the pivot point 162 being lower than the pivot point 161 by a similar amount $x$, it is apparent that the distance between the center of the pivot point and the center of shaft 167 is only $(h-2x)$. Likewise, the effect of elongation of the arm 155 as a lever arm to move the plate 151 when arm 155 is resting upon the outer surface of the cam 170 having maximum diameter is to move the plate 151 to the left relative to its position in FIG. 20 by an amount equal to $2y$ with respect to its initial position. This separates the plate 151 from the center of the shaft 167 by a distance $(w+2y)$. Consequently, if the plate 151 is held spring-pressed against the outer edge of one of the arms 153, 154, or 155, and if the plate is mounted on the pictorial image support, lateral movement of the plate displaces the pictorial image relative to the cabinet window. Such displacement of the pictorial representation relative to the masking element provides for viewing the different images.

This provides for laterally shifting the relative position between the pictorial representation, assumed as the representations A, B and C, as in FIGS. 12, 13, and 14. Accordingly, if it be considered that the incremental area C is displayed, with the plate 151 in the position shown in FIG. 19, it becomes immediately apparent that incremental areas B and A, respectively, will be carried to a position behind the apertures 19 of the masking plate when the guide plate 151 is, respectively, in the positions shown by FIGS. 20 and 21. Instead of the assumed reciprocatory functioning as shown by FIGS. 15 and 16 to provide for returning the relative position of the pictorial representation and mask to its initial state, the mechanism here shown provides a quick return due to the fact that the shorter radius of each of the cams 169 and 170 is substantially less than that of the cam or disk 168 and, consequently, as soon as the trailing edge of the large radius portion of the cams 169 and 170 passes beyond the contact position with the arms 154 and 155, the relative position of the mask and pictorial representation corresponds to that shown to be obtained by the arm 153 resting against the plate 151. This gives a quick-return operation. Further rotation of the shaft 167 repeats the process of picture exhibiting.

The modification of FIG. 22 is one of a different form of mechanism to display the pictorial representations relative to the viewing window and masking element and to repeat the same in any selected order, such as A—B—C—A—B, and so on. In this modification the pictorial representation is shown schematically at 191. It is held within the frame 192. This frame is positioned adjacent to the plate 193 carrying the masking element or unit (here not shown since it is behind the representation 191 in the view). The mask, however, is substantially like that shown by element 17 in other figures of the drawing.

The plate 193 is held within the upper plate of the cabinet structure 13 (here only a part of the cabinet structure is shown for simplicity, although it will be appreciated that the cabinet structure is essentially like that shown by FIG. 3) and from the lower portion of the plate 193 a bracket plate 194 is carried and supported from approximately its mid-point loosely upon a pin 194' projecting through the lower portion of the plate 193 and into and through the bracket plate 194. The bracket plate 194 is, in turn, secured to the frame 192 by clamps 194" along the upper edge thereof so that the frame 192 rests therein and is precluded from movement except with removal of the bracket plate 194. The lower portion of the bracket plate 194 is located within the slotted region 195 of a guide plate member 196 rested against the lower portion 193' of the cabinet frame 13.

A disk 197, supported upon a shaft (not shown), which extends through the bracket plate 193, is adapted to be turned by means of a hand knob 253, shown in dotted outline and which is located on the front side of the bracket plate 194. On the rear side and protruding outwardly from the disk is an eccentrically mounted pin 198 which, with turning of the disk 197 and the hand knob 253, causes the pin 196 to turn and with it generally to move up and down within the slot 195 but to produce thereby a limited amount of rotation of the complete bracket frame 194 about the support pin 194'. This, it will be seen, provides a relative angular adjustment of the positioning of the pictorial representation 191 with respect to the masking element (not shown) held and supported by the plate 193.

The lower right hand corner of the bracket plate 194 (looking at the plate from the direction of FIG. 22) has a threaded opening into which a screw 199, having a knurled head 199', is fastened. The screw 199 is positioned to pass through the slot 201 in the lower corner of bracket 202 so that the knurled head, when the screw is tightly drawn up into the threaded opening in the bracket 194, may clamp the unit tightly to prevent rotation and to hold and maintain the desired relative adjustment of the angular positioning of the pictorial representations 191 relative to its associated mask. To effect movement the knurled head 199' is loosened prior to making any adjustment by means of the hand knob 253 and, depending upon the amount of rotation of the hand knob 253 the position at which the screw 199 will be later tightened within the elongated slot 201 is established.

Supported upon the bracket plate 194 there is a motor conventionally represented at 204 which is suitably fastened to the plate. The motor is provided with suitable gear reduction (not shown) from its rotary shaft to turn the shaft 205 at any desired rate of speed relative to that of the motor shaft itself in order to control the movement of the reciprocating mechanism for the frame 192 to be described. The driven shaft element 205 protrudes through the bracket frame 194 at its inner end and terminates on the opposite side of the bracket plate 194 from that shown by FIG. 22. It carries a cam element 207 having three different radius arcuate portions, shown respectively at 208, 209, and 210. The difference in radius of the sections 208 and 210 indicates the maximum amount of upward displacement of the cam follower 211. The cam 207, adapted to rotate in the direction shown by the arrow, is caused to move the cam follower 211, held by a bracket 211' hung from a pin 212 at the outer end of the arm 214, in an up and down relationship. The pin 212 extends through an opening 213 in the bracket frame 194 and on its rear side carries the bracket 211' upon which the cam follower 211 is supported.

With rotation of the cam 207 the cam follower moves up and down and with it the L-shaped arm 214 is also moved through the link mechanism provided by the bracket 211' and the pin 212. The L-shaped arm is pivoted about a pivot pin 216 to which is also attached the outer end of an arm 217 which is supported for pivotal movement about a pin 218 carried in the upper end of a substantially vertical arm 219. Arm 219 is held in a position determined by pin 220 and is adapted to be rotated through a limited angle about pin 220 as a center. The pin 220 extends through the bracket frame 194 as a support.

The outer end of the L-shaped lever arm 214 which is pivoted about the point 216, linking together this L-shaped arm and the arm 217, terminates in a slotted member 215. This L-shaped arm is normally pulled downwardly so that its outer end 229 tends to bring the cam follower 211 to the outer sections of the cam 207. This is accomplished by means of a tension spring 225 held at one end about the pin 226 on the L-shaped arm and anchored at its other end about the pin 227 in the bracket frame. The arm 217 terminates at its right-hand end as a forked section, indicated at 223, for which adjustment is provided to rotate the arm about its pivot point 218. A pin 231 is provided on the frame 192 to extend through the slotted end 215 of the L-shaped arm and this pin is held tightly within the slot by means of a tension spring 235 which extends at its upper end over the pin 231 and at its lower end is also anchored to the pin 227 in the bracket frame 194.

It will be appreciated from what has been said that if the cam 207 is rotated the outer end 229 of the L-shaped arm 214 moves up and down and tends to turn the slotted portion 215 about its pivotal connection at the pin 216 which is joined to the arm 217. Consequently, any tendency of the L-shaped arm to rotate about the pin 216 causes the slotted member 215 to turn and with it the pin 231 is moved right and left in the directions shown by the arrows in the fashion here shown. The movement occurs in three distinct steps represented by the cam surface areas 208, 209, and 210, and these then move the frame 192 relative to the plate 193 which carries the mask in selected steps in a direction from left to right. Following the rotation of the cam 207 to a point where the follower leaves the cam surface 210 to return to the surface 208 there is an abrupt change in the position of the follower and the outer end of the L-shaped arm 214 so that a quick return motion in the direction from right to left, looking at FIG. 22, is provided.

The amount of displacement of the representation 191 from left to right is governed by the length of the lever arm between the pin 216 and the pin 231. Where the throw is to be increased the length of this lever arm and thus the separation between the pins 216 and 231 is to be increased but where the throw is too great, the length of the lever arm may effectively be shortened.

Shortening or lengthening of the lever arm is achieved by the provision of a disk 238 carried upon a pin 239 extending through the bracket plate 194 and having a hand wheel 238' at its rear to turn it. The disk 238 has a pin 237 mounted eccentrically thereon with the pin being adapted to extend through the forked or slotted end 223 of the pivoted member 217. Thus, with rotation of the hand knob 238' and with it the disk 238 (the hand knob 238' and the disk 238 being on opposite sides of the bracket frame 194) the arm 217 is adapted to be turned about the pivot point provided by the pin 218. Rotating the hand knob 238' in a direction to turn the arm 217 counter-clockwise about the pin 218 lengthens the lever arm between the pin 231 which is fastened in the frame 192 and the pivot point 216 so that the lateral displacement provided by rotation of the cam 213 is increased. Conversely, clockwise rotation of the arm 217 shortens the lever arm so that the displacement is decreased. The adjustment so provided is one which makes possible a relative displacement between the pictorial image strips and the masking strip whereby each step movement of the cam reveals one or the other pictorial images through the mask apertures and does not permit any undesirable overlaps.

From the foregoing it is apparent that both the length of the throw and the relative angular positioning of the pictorial image strips and the mask have been provided. There remains to be provided a relative adjustment so that there is precise alignment between the mask apertures and each individual pictorial strip. This is provided by shifting laterally the complete frame 192 within the locating brackets 194″ and is provided by means of a control effected by the rotation of a disk member 245, carried upon a pin 246 extending through the bracket frame 194 and having a control knob 247 on the front side of the bracket frame. The disk 245 carries an eccentrically positioned pin 248 which is adapted to fit within the slot 221 at the lower end of the pivoted member 219 so that rotation of the hand knob 248 and with it the disk 245 and the pin 248 causes the arm 219 to rotate about the support pin 220 in either a clockwise or a counter-clockwise direction. A counter-clockwise rotation shifts the position of the pin 216 to the left with respect to the pin 231 whereas a clockwise rotation moves this pin 216 to the right. The overall adjustment is one which thus can provide a limited amount of displacement of the pictorial representation relative to the mask in a direction normal to the long dimension of the mask apertures and thus provide precise alignment between the different pictorial representations as disclosed, for instance, in FIGS. 12 through 16.

It will, of course, be apparent that other and further modifications may be made without departing from the spirit and scope of what has herein been set forth and described.

Having now described the invention, what is claimed is:

1. Display apparatus comprising a cabinet structure having a viewing window, a pictorial representation comprising a plurality of segregated similarly positioned like-size incremental spaced strip areas forming a plurality of different representations, the strip areas being arranged substantially parallel to each other with adjacent strips separated by a border area having uniform light transmitting characteristics, the pictorial representations formed by the incremental strip areas being arranged in orderly sequences repeating as a series a, b, c, . . . n, the border areas each being of a width which is a minor fraction of that of a pictorial incremental area, a masking strip area having a plurality of light transmitting incremental strip areas each of a width substantially corresponding to a single incremental strip of the pictorial representation and separated from each other by a masking region of a width corresponding to the combined width of the number of incremental strips of pictorial representations intervening between adjacent inncremetal areas of like pictorial areas and the borders of constant light transmitting characteristics, a driving means connected to one of the mask elements and the pictorial representations relative to each other, means to provide stepped movement between the mask and pictorial representation for revealing all incremental strips of each separate pictorial representation simultaneously through the mask element apertures and for stepping the movement between the several separate pictorial representations, and means to control the period of dwell of each incremental area within the apertures of the mask.

2. The apparatus claimed in claim 1 wherein the means to provide the stepped movement comprises a driving yoke and a plurality of angularly displaced cams for interruptedly moving the yoke, the angular displacement of the cams determining the period of relative dwell of the incremental strip areas of each separate pictorial representation within the mask apertures.

3. The apparatus claimed in claim 1 comprising, in addition, means to support the mask element in overlapped relationship relative to the cabinet viewing window and means to rotate the mask through limited angles to aline the mask apertures and the incremental strip areas of the pictorial representation.

4. The apparatus as claimed in claim 1 in which the driving means comprises a yoke element, a shaft supported within the yoke element, means for rotating the shaft, a plurality of cam elements supported upon the shaft in angularly displaced relationship to each other, a plurality of follower pins supported by the yoke on opposite sides of the driving shaft and adapted to be contacted by the cams during each rotation thereof so that complete rotation of a plurality of cams moves the yoke back and forth in stepped fashion relative to the drive shaft, and means for imparting back and forth movement to the pictorial representations corresponding to the movement of the yoke.

5. The apparatus claimed in claim 4 comprising, in addition, means for adjusting the relative positions of each of the cam-follower pins within the yoke to bring each incremental area of the different pictorial representations into substantially precise registry with the apertures of the mask at each motional step.

6. The apparatus claimed in claim 5 comprising means for controllably locking the cams to the driving shaft in selected angular positions thereby to establish and control the display period of the incremental areas of different pictorial representations within the mask apertures.

7. Display apparatus for displaying pictorial representations formed as a series of adjacently positioned incremental strips of separate pictorial images with adjacent strips being separated by border areas of uniform light transmitting characteristics which are of a minor fraction only of the width of each incremental pictorial strip and wherein the incremental strips are positioned according to a pattern a, b, c, . . . n, where a, b, c, and n represent different pictorial images and the separation between adjacent incremental strips of like pictorial representations is less than the resolving power of the eye and wherein the incremental strips of each separate pictorial representation are concurrently exhibited through a masking element having apertures of substantially like width corresponding to the width of the incremental strips and the mask apertures are separated from each other by a width equal to the number of incremental strips of pictorial representations different from one being instantaneously exhibited plus the borders of like light transmitting characteristics, the mechanism for changing between different observable images within the mask apertures which comprises a pair of support frames for holding the mask and the plurality of pictorial representations, means for normally maintaining a relative positioning between the frames to exhibit one set of like incremental strips within the mask apertures, a plurality of cam elements, a drive shaft for supporting all of the cam elements, a plurality of swingable pivoted arms supported for free movement from one end so that the arms are adapted to rest against individual cam surfaces at points between the support point at the outer end so that with cam rotation the arms are individually rotated from the support point, a contact plate at the end of one of the frame elements and means for moving the contact plate by the outer end of the arms to displace the frames relative to each other and thereby to bring different incremental strip areas of different pictorial representations within the field of the mask apertures.

8. The display apparatus claimed in claim 7 comprising, in addition, means for controlling the length of the swingable lever arm between the contact point at the driven plate and the cam surface thereby to establish the displacement between the two said frame members.

9. The display apparatus claimed in claim 7 wherein the cams are peripherally contoured to provide a displacement of the contact plate in one direction of motion which corresponds to the width of an incremental strip of representation plus that of one adjacent border area of constant light transmitting value and in the other direction of motion completely release the drive plate.

10. In display apparatus wherein differential pictorial representations are successively viewable through aperture strips of a masking element in which the aperture strips are spaced by distances corresponding to the total number of pictorial representations to be separately viewed less one and a corresponding number of border strip areas of constant light transmitting characteristics, the means to provide selected viewing of the individual representations in desired order which comprises driving means for providing reciprocating movement between the mask and pictorial representations, cam and follower means to arrest and initiate the reciprocating motion in a step-like sequence, and means to control the relative positions of the followers and cam surfaces to determine the periods of arrested motion and dwell of the strips representing the components of the different pictorial representations.

11. The apparatus claimed in claim 10 comprising, in addition, means to control the displacement between the mask and the pictorial representations at each step of step-like movement.

12. The apparatus claimed in claim 10 comprising, in addition, means to adjust laterally the relative position of the mask apertures and the incremental strip areas of the pictorial representation at each position of rest thereby to aline the mask apertures with the incremental strips.

13. The apparatus as claimed in claim 10 comprising, in addition, means to adjust angularly the relative positioning of the mask apertures and the incremental strips.

14. The apparatus as claimed in claim 10 comprising, in addition, cam means to initiate the displacement between the mask and pictorial representations.

15. The apparatus as claimed in claim 10 comprising, in addition, a drive pin on one of the mask and pictorial representations, a pivoted bell crank lever for driving the drive pin from one lever arm thereof and means for controllably rotating the bell crank through limited angles from the lever arm thereof.

16. The apparatus claimed in claim 15 comprising, in addition, a cam for displacing the bell crank with cam rotation in successive steps equal in number to the number of pictorial representations in one direction of movement and promptly returning at the limit of movement to the initial position or returning in stepped movement in the opposite direction to the initial position, and means for driving the cam.

17. The apparatus as claimed in claim 16 comprising, in addition, a link mechanism for effecting reciprocation between the mask and pictorial representations a variance of the length of each stepped movement and an angular alinement between the masked apertures and the incremental strip areas of the pictorial representations, said link mechanism comprising means for changing the length of the lever arm of the bell crank lever to displace the mask and pictorial representations, means to shift laterally the pivot point of the bell crank lever to aline the mask apertures and the incremental strips of the pictorial representations, and means to rotate the assembly of the link mechanism and the driving cam for effecting relative angular adjustment between the mask apertures and the incremental strip areas.

References Cited in the file of this patent

UNITED STATES PATENTS

| 829,492 | Spiegel | Aug. 28, 1906 |
| 911,561 | Spiegel | Feb. 2, 1909 |
| 957,120 | Spiegel | May 3, 1910 |

FOREIGN PATENTS

| 849,668 | France | Nov. 29, 1939 |